(No Model.) 2 Sheets—Sheet 1.
S. JOHNSTON & G. H. RAYMOND.
HARVESTING MACHINE.
No. 331,887. Patented Dec. 8, 1885.
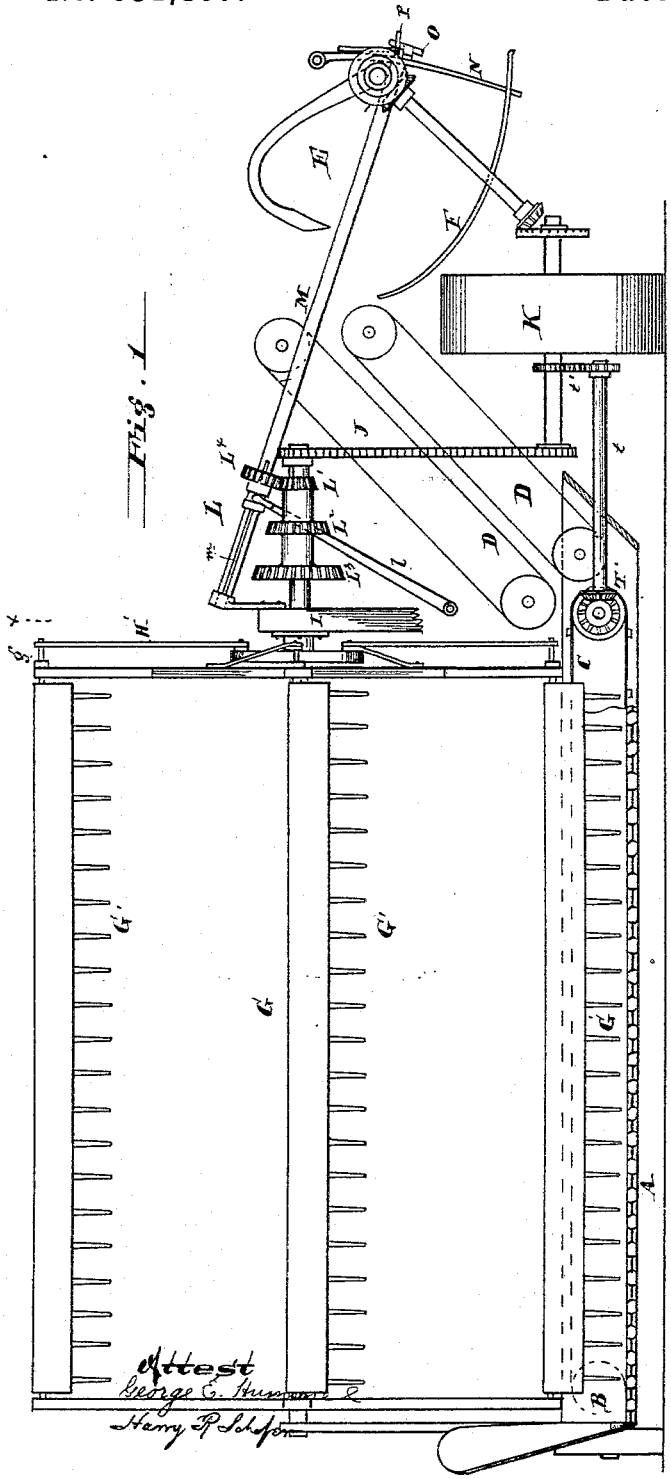
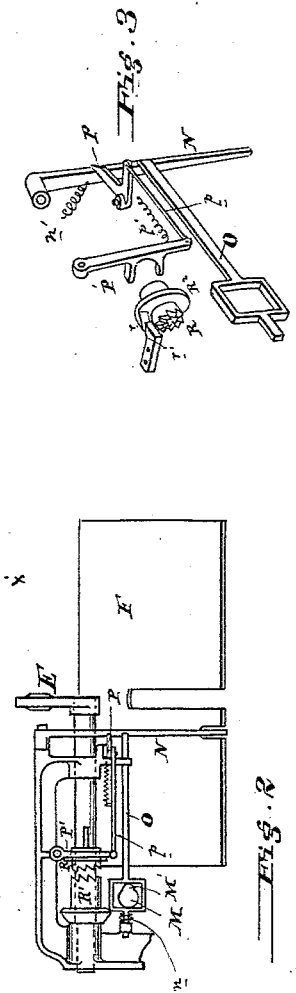

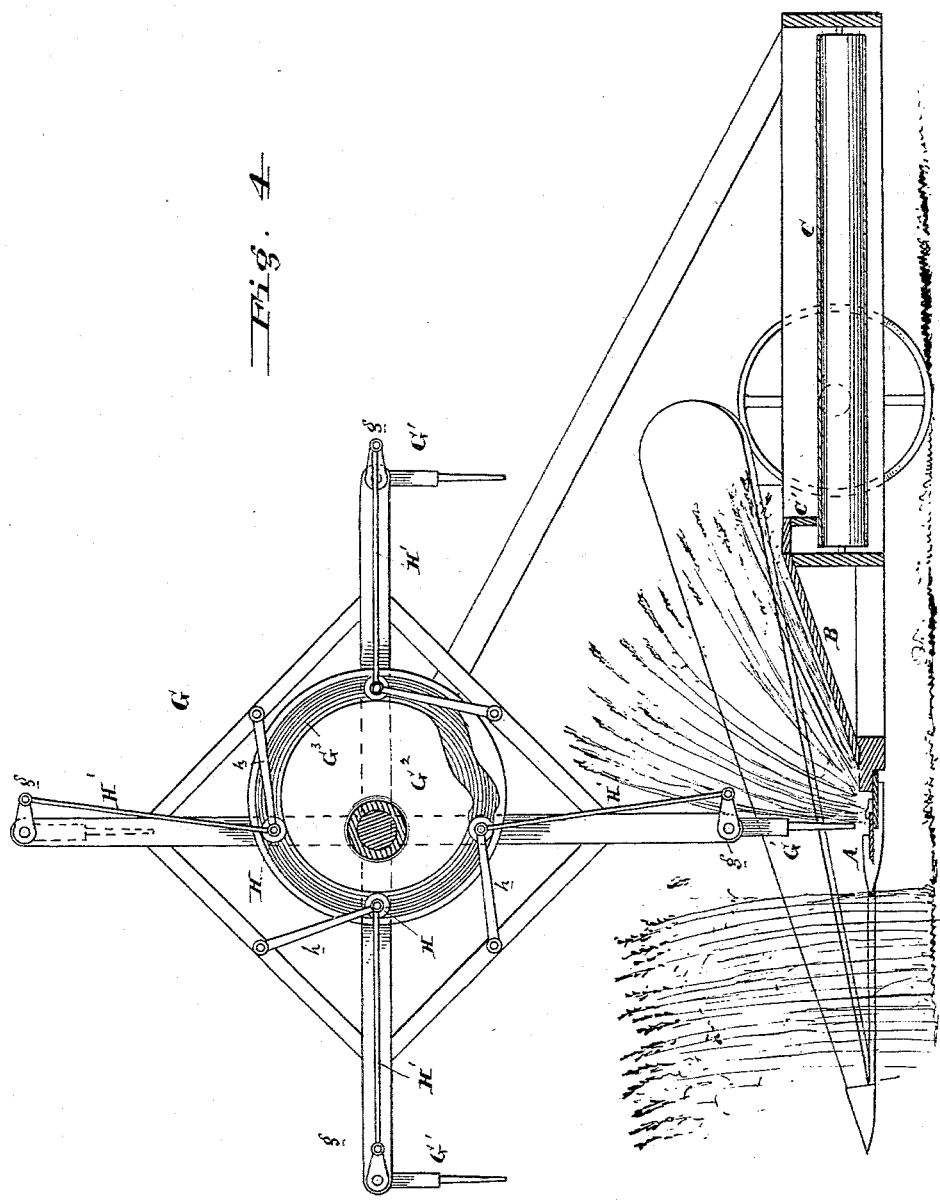

UNITED STATES PATENT OFFICE.

SAMUEL JOHNSTON AND GEORGE H. RAYMOND, OF BROCKPORT, NEW YORK.

HARVESTING-MACHINE.

SPECIFICATION forming part of Letters Patent No. 331,887, dated December 8, 1885.

Application filed May 22, 1884. Serial No. 132,379. (No model.)

*To all whom it may concern:*

Be it known that we, SAMUEL JOHNSTON and GEO. H. RAYMOND, both of Brockport, in the county of Monroe and State of New York, have invented a new and useful Improvement in Harvesting-Machines, of which the following is a specification.

Our invention has reference to that class of self-binding harvesters which are provided with rakes having arms or beaters armed with teeth to gather the grain to the cutters, a reeling-platform over which the grain is moved and deposited on the conveying mechanism, and an automatic lever for putting the binding mechanism in motion; and it consists in novel devices whereby the needle is prevented from descending until the proper instant for the purpose of putting the band around the bundle in the space between the beaters full of grain, as fully set forth in the following specification and shown in the accompanying drawings, which form part thereof.

The object of our invention is to cause the needle, when descending to place the band around the bundle, to pass through the clear space between two successive gavels or beaters full of grain.

In the drawings, Figure 1 is a front elevation of a harvesting-machine embodying our invention. Fig. 2 is an elevation of the binder-arm and its actuating mechanism, whereby it is automatically stopped and started. Fig. 3 is a perspective view of the main actuating mechanism shown in Fig. 2, and Fig. 4 is a sectional elevation of our improved machine on line $x\ x$ of Fig. 1.

A indicates the cutters. B is the intermediate reeling-platform, and C' is the butting-board, which is arranged substantially vertical to the endless conveyer C. The rear end of the reeling-platform may be on a level with the apron or conveyer, or raised a little above. The cut grain is swept over this reeling-platform by the rake-arms, and thus cause a clear separation between the cut and standing grain, and each gavel or beater full of cut grain is separately deposited upon the endless conveyer and conveyed away before the next gavel or beater full of grain falls upon it.

C is the endless conveyer or apron, and is driven from the drive-wheel shaft by means of gears and shaft or other suitable mechanism.

D D are the elevating-aprons, and convey the grain from the apron C and deliver it to the binding-table F.

K is the drive-wheel.

G is the rake or reel, and may be made in any manner desired, it being preferable that the arms or beaters be armed with teeth, and be adapted to deliver the grain a greater or less distance upon the endless conveyer.

Referring to the construction shown in Fig. 2, the rake or reel may be of any desired construction provided it sweeps the cut grain across the reeling-platform and delivers it to the conveyer, making a clear separation between the cut and standing grain. As shown, the reel-frame G is rotated by a chain, J, or suitable gearing at a speed commensurate with the speed of the drive-wheel K. The rake-arms G are hinged to said frame, and are provided with cranks $g$, which are connected by rods H' to rollers H, which run in a cam-groove, $G^3$, in the stationary cam $G^2$, and are connected to the reel by radial arms $h$.

E is the needle-arm of the binder, and may be caused to rotate or be otherwise operated by suitable gearing connected with the drive-wheel shaft. The ratchet-sleeve R' is continually revolving, and the clutch-sleeve R is allowed to slide upon the binder-shaft, but is prevented from rotating thereupon by a feather, and is provided with a disk, $R^2$, against which a lever, P', is adapted to be pressed to force said clutch against the revolving sleeve R', and thus cause the binder-shaft to rotate and the needle-arm descend. To throw the clutch away from the sleeve after making one revolution, an inclined lug, $r$, is formed on the clutch, and a stationary piece, $r'$, having a correspondingly-inclined face, is secured to the frame. When the two come into contact, the clutch is thrown back. The lever P' is operated against a spring, $p'$, by a rod, $p$, and bell-crank P, which in turn is actuated by the starting-lever N, which is hinged at its top and hangs in the path of the grain. When this lever N is forced back by the grain, the binder-arm descends, but this lever is prevented from acting except at certain intervals, corresponding to the spaces between the gavels or beaters full of grain, as it must not allow the needle-arm to descend except in the interval between two gavels or beaters full of grain, so that it shall pass down through an open and clear space, and not into the grain. To prevent this lever N moving back, we provide a latch or lock, O, kept in locking position by a spring, n, and is arranged to be drawn back to free the lever N by a cam, M', on the end of shaft M. On the rake or reel shaft is secured cone-gearing L' L² L³, with which a sliding pinion, L⁴, meshes, the said pinion being carried by shaft M, and prevented from rotating independently of said shaft by means of the feather m, and is moved into contact with either of the gears of the cone or into the spaces between them by a lever, l. When pinion L⁴ is meshing with gear L³, then the binder is timed so as to bind one gavel or beater full of grain at a time; if with gear L², then every two gavels or beaters full will be bound into a bundle at a time; and if with gear L', then every three gavels or beaters full of grain will be bound into a bundle at a time, and as the conveyer C is caused to move with a speed sufficiently rapid to convey away one gavel or beater full of grain before the next gavel or beater full falls upon it, a clear separation is made between each gavel or beater full of grain, and the needle-arm E descends through a clear space, and not through grain.

We do not limit ourselves to the details of construction shown, as there are many ways of accomplishing the objects set forth in this application without departing from our invention.

The location of the timing mechanism is immaterial, provided it be operated from some part which directly or indirectly controls the raking devices.

Having now described our invention, what we claim as new, and desire to secure by Letters Patent, is—

1. In a harvesting-machine, the combination of an endless carrier with a rake or reel, stationary binding mechanism, a starting lever or arm to throw said binding mechanism into operation, and a locking and releasing mechanism for said starting-lever, controlled by the said rake or reel or its actuating mechanism, to control the time of action of said lever and make it act synchronously with the rake-arms, whereby the needle is caused to pass between two successive gavels or beaters full of grain, substantially as and for the purpose specified.

2. In a harvesting-machine, the combination of an endless carrier with a reeling-platform located between the cutters and endless carrier, a rake or reel, stationary binding mechanism, a starting lever or arm to throw said binding mechanism into operation, and a locking and releasing mechanism for said starting-lever, controlled by the said rake or reel or its actuating mechanism, to control the time of action of said lever and make it act synchronously with the rake-arms, whereby the needle is caused to pass between two successive gavels or beaters full of grain, substantially as and for the purpose specified.

3. In a harvesting-machine, the combination of an endless carrier with an inclined reeling-platform located between the cutters and endless carrier, a rake or reel, stationary binding mechanism, a starting lever or arm to throw said binding mechanism into operation, and a locking and releasing mechanism for said starting-lever, controlled by the said rake or reel or its actuating mechanism, to control the time of action of said lever and make it act synchronously with the rake-arms, whereby the needle is caused to pass between two successive gavels or beaters full of grain, substantially as and for the purpose specified.

4. In a harvesting-machine, the combination of an endless carrier, a rake or reel, stationary binding mechanism, a starting lever or arm to throw the binding mechanism into operation, a spring acting upon said lever to offer a resistance to its movement, and locking and releasing mechanism for said starting-lever, controlled by the said rake or reel or its actuating mechanism, to control the time of action of said lever and make it act synchronously with the rake-arms, whereby the needle is caused to pass between two successive gavels or beaters full of grain, substantially as and for the purpose specified.

5. In a harvesting-machine, the combination of an endless carrier, a rake or reel, stationary binding mechanism, a starting lever or arm to throw said binding mechanism into operation, and locking and releasing mechanism for starting said lever, controlled by the said rake or reel or its actuating mechanism, to control the time of action of said lever and make it act synchronously with the rake-arms, whereby the needle is caused to pass between two successive gavels or beaters full of grain, and adjustable timing mechanism by which the operation of the locking and releasing mechanism may be varied, substantially as and for the purpose specified.

In testimony of which invention we hereunto set our hands.

SAMUEL JOHNSTON.
GEORGE H. RAYMOND.

Witnesses:
GEO. P. DECKER,
WILLIS A. SCHORETON.